United States Patent
Abdi et al.

(10) Patent No.: US 9,650,195 B2
(45) Date of Patent: May 16, 2017

(54) FAIL-SAFE CONTAINMENT DEVICE FOR CONTAINING VOLATILE FLUIDS

(71) Applicant: H2Safe, LLC, Los Angeles, CA (US)

(72) Inventors: Francis F. Abdi, Anaheim, CA (US); Jonas Surdenas, Long Beach, CA (US); Mohamad Reza Talagani, Long Beach, CA (US)

(73) Assignee: H2Safe, LLC, Los Angeles, CA (US)

( * ) Notice: Subject to any disclaimer, the term of this patent is extended or adjusted under 35 U.S.C. 154(b) by 0 days.

(21) Appl. No.: 14/818,155

(22) Filed: Aug. 4, 2015

(65) Prior Publication Data
US 2016/0114952 A1    Apr. 28, 2016

Related U.S. Application Data

(60) Provisional application No. 62/068,574, filed on Oct. 24, 2014, provisional application No. 62/102,087,
(Continued)

(51) Int. Cl.
*B65D 81/02* (2006.01)
*B65D 6/00* (2006.01)
(Continued)

(52) U.S. Cl.
CPC ........ *B65D 81/02* (2013.01); *B60K 15/03006* (2013.01); *B65D 11/20* (2013.01);
(Continued)

(58) Field of Classification Search
CPC .... B65D 81/025; B65D 81/022; B65D 81/02; B65D 11/20; B65D 1/40; B65D 90/02;
(Continued)

(56) References Cited

U.S. PATENT DOCUMENTS

| 194,217 A | 8/1877 | Bushnell |
| 575,526 A | 1/1897 | McIntyre |

(Continued)

FOREIGN PATENT DOCUMENTS

| DE | 19740471 C1 | 2/1999 |
| DE | 10103149 A1 | 8/2002 |

(Continued)

OTHER PUBLICATIONS

Examination Report for related New Zealand Patent Application No. 527968, mailed Oct. 4, 2005, Intellectual Property Office of New Zealand. 2 Pages.

(Continued)

*Primary Examiner* — Robert J Hicks
(74) *Attorney, Agent, or Firm* — Barcelo, Harrison & Walker LLP

(57) ABSTRACT

A fail safe container and container insert are disclosed. A flexible container insert may convert energy from a catastrophic event, including but not limited to collisions, accidents, impacts, pressure container failures or explosions such as detonations, or other catastrophic incidents, into a stretching of an internal structure of a fail-safe container insert to minimize or prevent failure of the container insert and/or the container. The stretchability of the container insert may accommodate both temperature and shape changes to protect a container, including but not limited to a pressure vessel, from rupture or other failure. Accordingly, a container insert may be considered self-healing in that it may absorb the effects of catastrophic events to prevent failure, may return to a generally previous condition, and/or may seal or otherwise reduce or minimize breaches when they do occur.

26 Claims, 8 Drawing Sheets

Related U.S. Application Data filed on Jan. 11, 2015, provisional application No. 62/128,493, filed on Mar. 4, 2015.

(51) Int. Cl.
| | | |
|---|---|---|
| *B65D 85/00* | (2006.01) | |
| *B60K 15/03* | (2006.01) | |
| *F17C 1/06* | (2006.01) | |
| *F17C 13/12* | (2006.01) | |

(52) U.S. Cl.
CPC ............... *B65D 85/70* (2013.01); *F17C 1/06* (2013.01); *F17C 13/123* (2013.01); *B60K 2015/0344* (2013.01); *B60Y 2306/01* (2013.01); *F17C 2201/0109* (2013.01); *F17C 2201/0166* (2013.01); *F17C 2201/0171* (2013.01); *F17C 2201/056* (2013.01); *F17C 2203/013* (2013.01); *F17C 2203/0604* (2013.01); *F17C 2203/0619* (2013.01); *F17C 2203/0663* (2013.01); *F17C 2221/033* (2013.01); *F17C 2223/0123* (2013.01); *F17C 2223/036* (2013.01); *F17C 2260/042* (2013.01); *F17C 2270/0168* (2013.01)

(58) Field of Classification Search
CPC ........ B65D 90/22; B65D 25/04; B65D 25/06; B65D 37/32; B65D 85/70; B60K 15/03006; F17C 1/06; F17C 13/123
USPC ... 220/561, 560.01, 530, 529, 563, 501, 500
See application file for complete search history.

(56) References Cited

U.S. PATENT DOCUMENTS

| | | | |
|---|---|---|---|
| 1,436,985 A | 7/1920 | Friant | |
| 1,392,892 A * | 10/1921 | Imber | B64D 37/06 |
| | | | 220/560.03 |
| 1,477,686 A | 12/1923 | Braender | |
| 1,544,854 A | 7/1925 | Mueller et al. | |
| 1,616,008 A | 2/1927 | Stout | |
| 2,001,996 A | 5/1935 | Whitman | |
| 2,171,973 A | 9/1939 | Debor | |
| 2,379,126 A | 6/1945 | Welden | |
| 2,451,486 A | 10/1948 | Horton | |
| 2,533,431 A | 12/1950 | Chausson | |
| 2,552,119 A | 5/1951 | Scharenberg | |
| 2,696,247 A | 12/1954 | Hiltner | |
| 2,724,597 A * | 11/1955 | Fowler | B60P 3/2225 |
| | | | 220/563 |
| 2,871,669 A | 2/1959 | Mann et al. | |
| 2,967,699 A | 1/1961 | Brown | |
| 3,069,042 A | 12/1962 | Johnston | |
| 3,122,259 A | 2/1964 | Meesen | |
| 3,187,766 A * | 6/1965 | Black | B60P 3/225 |
| | | | 137/267 |
| 3,246,789 A | 4/1966 | Progler | |
| 3,314,567 A * | 4/1967 | Becker | B63B 25/12 |
| | | | 114/74 A |
| 3,338,238 A | 8/1967 | Warncke | |
| 3,379,336 A | 4/1968 | Stedfeld | |
| 3,400,854 A * | 9/1968 | Conaway | B60K 15/077 |
| | | | 220/734 |
| 3,489,643 A * | 1/1970 | Hoffman | D21H 5/20 |
| | | | 162/146 |
| 3,514,365 A * | 5/1970 | Blaies, Jr. | B29C 51/145 |
| | | | 156/209 |
| 3,664,379 A | 5/1972 | McCabe | |
| 3,690,606 A | 9/1972 | Pall | |
| 3,692,205 A | 9/1972 | Cowles et al. | |
| 3,698,145 A | 10/1972 | Newman et al. | |
| 3,732,690 A | 5/1973 | Meijer | |
| 3,764,277 A | 10/1973 | Hollis | |
| 3,895,152 A | 7/1975 | Carlson et al. | |
| 3,951,362 A * | 4/1976 | Robinson | B64D 37/06 |
| | | | 114/74 A |
| 3,969,563 A | 7/1976 | Hollis, Sr. | |
| 3,970,208 A | 7/1976 | Raes | |
| 4,013,190 A * | 3/1977 | Wiggins | A62C 4/00 |
| | | | 220/501 |
| 4,023,617 A | 5/1977 | Carlson et al. | |
| 4,088,240 A | 5/1978 | San Miguel | |
| 4,125,202 A | 11/1978 | Schilling | |
| 4,172,152 A | 10/1979 | Carlisle | |
| 4,410,482 A * | 10/1983 | Subramanian | B29C 47/0004 |
| | | | 264/171.28 |
| 4,422,561 A | 12/1983 | Grosvenor et al. | |
| 4,454,945 A | 6/1984 | Jabarin et al. | |
| 4,498,261 A | 2/1985 | Wilson et al. | |
| 4,539,244 A | 9/1985 | Beggs et al. | |
| 4,777,974 A | 10/1988 | Swift et al. | |
| 4,923,095 A | 5/1990 | Dorfman et al. | |
| 4,930,650 A | 6/1990 | Wells | |
| 4,932,403 A | 6/1990 | Scholley | |
| 4,946,056 A | 8/1990 | Stannard | |
| 5,311,750 A | 5/1994 | Stark | |
| 5,346,371 A | 9/1994 | Bialy et al. | |
| 5,350,000 A | 9/1994 | Wang | |
| 5,398,839 A | 3/1995 | Kleyn | |
| 5,438,597 A | 8/1995 | Lehnert et al. | |
| 5,503,295 A | 4/1996 | Kotarba et al. | |
| 5,547,096 A | 8/1996 | Kleyn | |
| 5,653,836 A | 8/1997 | Mnich et al. | |
| 5,848,720 A * | 12/1998 | Logan | B60K 15/073 |
| | | | 220/4.14 |
| 5,960,981 A | 10/1999 | Dodson et al. | |
| 6,003,283 A | 12/1999 | Hull | |
| 6,010,027 A | 1/2000 | Fujii et al. | |
| 6,029,933 A | 2/2000 | Holman et al. | |
| 6,032,347 A * | 3/2000 | Behr | B60K 15/077 |
| | | | 220/563 |
| 6,095,367 A | 8/2000 | Blair | |
| 6,135,238 A | 10/2000 | Arcas et al. | |
| 6,412,650 B1 | 7/2002 | Warner | |
| 6,457,636 B1 | 10/2002 | Van De Ven et al. | |
| 6,595,382 B2 | 7/2003 | Ettlinger | |
| 6,612,092 B1 | 9/2003 | Mabru et al. | |
| 6,634,421 B2 | 10/2003 | Ognibene et al. | |
| 6,668,561 B1 | 12/2003 | Sheu et al. | |
| 6,742,554 B1 | 6/2004 | Immel | |
| 7,393,572 B1 * | 7/2008 | Monk | B60K 15/03177 |
| | | | 220/560.02 |
| 8,091,465 B2 | 1/2012 | Ravid et al. | |
| 2004/0060304 A1 | 4/2004 | Aceves et al. | |
| 2004/0134916 A1* | 7/2004 | Bambacigno | B60P 3/2235 |
| | | | 220/563 |
| 2005/0092756 A1 | 5/2005 | Goggin | |
| 2007/0102433 A1 | 5/2007 | Allidieres et al. | |
| 2008/0264951 A1 | 10/2008 | Tweet et al. | |

FOREIGN PATENT DOCUMENTS

| | | |
|---|---|---|
| FR | 2671542 A | 7/1992 |
| FR | 2781431 A | 1/2000 |
| FR | 2781555 A | 1/2000 |
| WO | 9623721 A1 | 8/1996 |
| WO | 0005535 A1 | 2/2000 |
| WO | 0195966 | 12/2001 |

OTHER PUBLICATIONS

International Search Report for related PCT Application No. PCT/NZ2004/1000205, mailed Dec. 3, 2004, Australian Patent Office. 3 Pages.
First office action dated Jun. 1, 2007, in related Chinese Appl. No. 200480023645.1. 6 Pages.
Second office action dated Mar. 28, 2008, in related Chinese Appl. No. 200480023645.1. 6 Pages.
Third Office Action dated Aug. 22, 2008, in related Chinese Appl. No. 200480023645.1. 5 Pages.

(56) References Cited

OTHER PUBLICATIONS

Fourth Office Action dated Feb. 5, 2010, in related Chinese Application No. 200480023645.1. 4 Pages.
European Search Report dated Jun. 13, 2008, in related European Application No. 04077446.5. 2 Pages.
First Office Action dated Feb. 26, 2009, in related European Application No. 04077446.5. 3 Pages.
Second Office Action dated Sep. 11, 2009, in related European Application No. 04077446.5. 2 Pages.
The Montana Water Center. "Ground Water Manual for Small Water Systems". Montana State University. Jan. 1999, p. 7-10. 4 Pages.
International Preliminary Report on Patentability and the Written Opinion mailed Jul. 4, 2013, in related International Application No. PCT/US2011/042439. 8 Pages.
ISR and Written Opinion for related PCT Application No. PCT/US2011/042439, dated Dec. 6, 2011. 10 Pages.

\* cited by examiner

US 9,650,195 B2

FAIL-SAFE CONTAINMENT DEVICE FOR CONTAINING VOLATILE FLUIDS

RELATED APPLICATIONS

This Application claims priority to (1) Provisional U.S. Patent Application No. 62/068,574, filed Oct. 24, 2014, entitled A DEVICE ASSEMBLAGE FOR PRESSURIZED CONTAINERS; (2) Provisional U.S. Patent Application No. 62/102,087, filed Jan. 11, 2015, entitled A DEVICE ASSEMBLAGE FOR PRESSURIZED CONTAINERS; and (3) Provisional U.S. Patent Application No. 62/128,493, filed Mar. 4, 2015, entitled A DEVICE ASSEMBLAGE FOR PRESSURIZED CONTAINERS. The contents of each of the foregoing applications is incorporated by reference herein in its entirety.

FIELD OF THE INVENTION

The disclosure generally relates to systems and methods for containing and transporting volatile, flammable, and explosive material and more particularly to fail-safe containment and transportation of such materials when exposed to detonation, overpressure, penetration or impact.

BACKGROUND OF THE INVENTION

Containing and transporting volatile, flammable, and explosive material poses serious risk when the containers are exposed to detonation, overpressure, penetration, or impact. This is particularly true when the material and associated containers are integrated into systems that have higher occurrences of such events. For example, when storage containers are transported or used as a fuel source in vehicles, the containers are subject to damage from collisions or penetration during accidents. Once the material is exposed, the health and safety of the occupants and response team may be at substantial risk.

The transportation, storage and handling of hazardous pressure containers used to contain or accommodate flammable, combustible, compressed and/or volatile fluids may be exposed to collision, incidents, degradation or deterioration that could cause premature and unwanted failure of a pressure container's wall(s), potentially in a surreptitious, rapid, subtle or insidious way, which may expose life to harm with significant possibility of major loss of life or economic damage(s). These types of incidents may occur during normal operating environments that are common in the transportation industry.

The Gas Research Institute (GRI), after several catastrophic explosions with compress natural gas (CNG) cylinders, desired to understand the automotive threat environments. In 1994, the GRI contracted Battelle to identify "service environments for automotive. Battelle listed Four (4) recommendations for industry. To date, no auto or cylinder manufacturer in the world has complied with Battelle's recommendations.

The objective of the industry survey was to define the mechanical and chemical environments encountered by NGV fuel cylinders in particular and for underbody component materials (especially composites) in general. The mechanical environments included long-term loadings due to fatigue and installation method, as well as short-lean loading such as impact damage from stones or baffle accidents. The potential chemical environments included fluids and chemicals both internal and external to the vehicles.[1]

Today, millions of compressed natural gas vehicles are in countries like Pakistan, Argentina, Brazil, India and the Asia-Pacific region. Experience in these regions has shown that premature pressure container failures and explosions of CNG cylinders (rated for 3600 psig) are on the rise due to faulty and aging pressure containers. In 2009, China banned all Type IV CNG cylinders after numerous intolerable tragic accidents. In 2013, Pakistan reported over 2000 and 3000 CNG incident related deaths in the last two consecutive years, respectively. In 2014, auto and pressure container manufacturers continued to manufacture and produce products that have risky lethal consequences that are based on unproven technologies claimed to be "good enough." Very soon high pressure and/or highly flammable compressed fuel containers for automobiles (at 3600 to 10,000 psig and higher) may be rolling out onto public highways near all of us around the world.

At present, the use of scientifically unproven, aging and vulnerable lightweight hazardous pressure containers may prevail in the public transportation sector as countries scramble and struggle to quickly economize on fuel consumption. In 2014, EPA posted a warning; "because hydrogen exhibits some special properties such as high flammability and explosivity, the possibility of explosion may increase due to its storage tank failure."[1]

There may be a heighted risk of pressure container failure (poorly constructed or not) at a fueling station and during filling i.e. pressurization of compressed hydrogen or natural gas, or shortly after filling. Alternately, failure may be caused by catastrophic events including but not limited to collisions, accidents, impacts or other catastrophic incidents. In certain embodiments described herein, the risk of a catastrophic pressure container failure or explosion (despite the condition, quality or incident) is eliminated for most synergistic service environments involving an automobile.

One of the design philosophies presented herein provides for a device assemblage that renders a containment device fail-safe.

DETAILED DESCRIPTION

Figure 1:
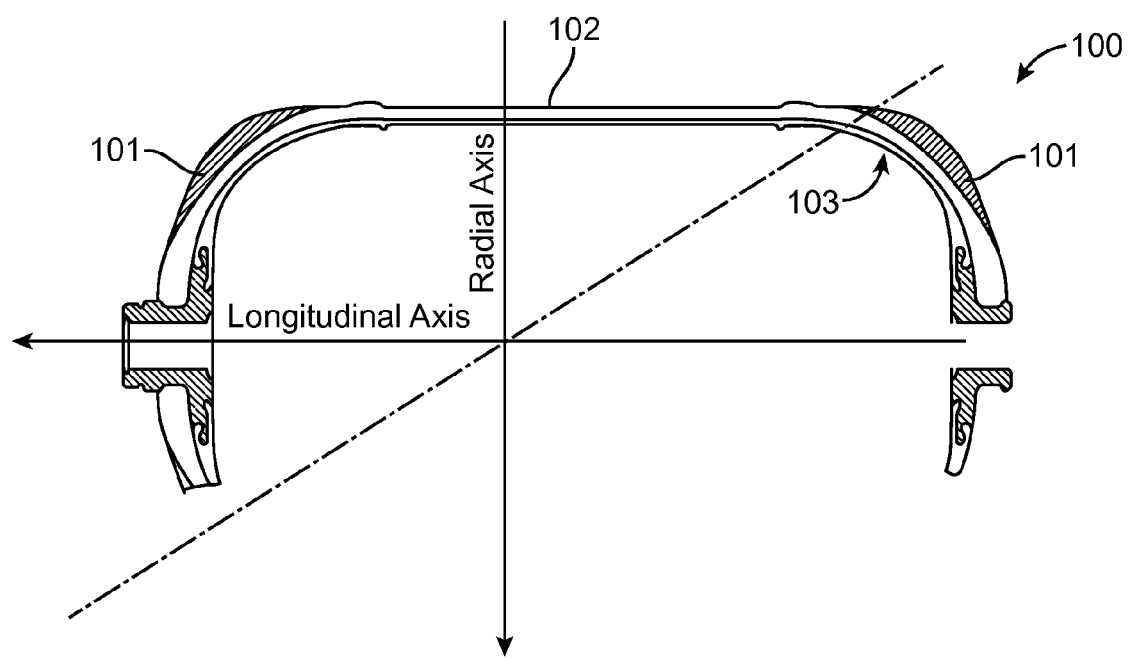
FIG. 1 depicts a longitudinal cross section of a composite cylinder in accordance with certain embodiments.

In certain embodiments, a containment vessel for receiving and removing, or passing fluid or gas is described herein. The containment vessel may comprise a flexible insert such that the interior cavity of the containment vessel defined by an outer wall is subdivided into a plurality of smaller sub-cavities by the flexible insert. The flexible insert may comprise a material that deforms or stretches with an applied force. In certain embodiments, substantial deformation may occur under forces greater than that experienced during normal operation, such that the flexible insert generally may maintains its shape, position, and configuration during normal operating conditions, but may deform or stretch under abnormal conditions having forces greater than those expected during normal operation.

In certain embodiments, a container may be a pressure vessel such that the device is activated due to loss of pressure. However, the term container is not intended to be limiting; to the extent that features described herein are applicable to other vessel types, one of ordinary skill in the art will recognize that they are included within the scope of the present invention. Accordingly, in certain embodiments, a container may include any full or partial enclosure, such as a shield, membrane, wrap, barrier, wall, shell, cover, shroud, bladder, receptacle, cylinder, tank, drum, barrel, pressure vessel, pressurized structures, housing, vent, tube, buffer, pipe, etc.

For example and without limitation, applications may include transporting fluid or gas through a pipe having a device assemblage inserted inside according to embodiments described herein. The design of the container insert may change to accommodate the application. Therefore, in the example of a pipe, a central passage may be enlarged to facilitate fluid flow while using sub-cavities along the exterior perimeter/circumference of the insert along the pipe wall. The shape of the cavities may also change to accommodate the redesign. In certain embodiments for gas/fluid transport such as piping, a wall sandwich construction using the sub-cavities for the core structure, which may be used for thermal insulation, shock insulation, self-sealing of tanks in the event of external wall rupture, and internal pipe detonation containment.

Other applications may include, for example, bomb or luggage containers in which an outer wall or outer volume of the interior space of the cavity is filled with a container insert as described and claimed herein or incorporates a device assemblage according to embodiments described herein such that an inner or central interior space is surrounded and shielded by the device assemblage. In certain embodiments, a container insert may be used for explosive material containment. A plurality of sub-cavities may be created as described herein that may surround an inner cavity for containing explosive material. In the event of an explosion in the inner cavity, the flexible material of the plurality of sub-cavities may expand to absorb the explosive forces without allowing the explosive energy to escape the container. In certain embodiments, large separate cavities could be used between sub-cavities. The sub-cavities may be constructed of separate barriers or permanent barriers. In certain embodiments, one or more of the barriers may include one or more perforation holes or other orifices to allow flow between sub-cavities while absorbing some of the pressure or explosive energy of a detonation. In certain embodiments, a bomb container may be used to contain solid items, and a plurality of sub cavities can be constructed to conform to the perimeter of the solid item. In certain embodiments, the plurality of cavities may be constructed of removable or adjustable baffles made of flexible material as described herein.

In certain embodiments, a container insert may comprises a flexible material that can stretch or deform before failing. For example and without limitation, the flexible insert may stretch by over 100% without failure, or between 100-500%, 200-400%, or 200-300% without failure. In certain embodiments, a container insert may deform elastically during a catastrophic event and generally may return to its original configuration after deformation. In certain embodiments, a container insert may comprise a superelastic material. In certain embodiments, a container insert may deform plastically during a catastrophic event to prevent failure of the container insert and/or the container.

In certain embodiments described herein, a flexible container insert may convert energy from a catastrophic event, such as detonation, into a stretching of an internal structure to minimize or prevent failure of the container insert and/or the container. In certain embodiments, the stretchability of the container insert may accommodate both temperature and shape changes to protect a container, including but not limited to a pressure vessel, from rupture or other failure. Accordingly, certain embodiments of the container insert may be considered self-healing in that it may absorb the effects of catastrophic events to prevent failure, may return to a generally previous condition, and/or seal or otherwise reduce or minimize breaches when they do occur.

In certain embodiments, a container insert may comprise baffles or orientations that may depend on the particular applications. For example and without limitation, a container insert for a pressure vessel may comprise a repeating internal structure that subdivides substantially the entire interior cavity of the vessel. In certain embodiments for transporting materials, such as in a pipe, a container insert may be limited to the perimeter or periphery of the structure to minimize interference with the transported material under normal operation.

Certain embodiments may comprise without limitation pressure vessels, pipes, containers, etc. that comprise a hyperelastic material that generally maintains an original shape during normal operating conditions, may conform to a new shape upon an externally applied force that corresponds to an event outside of normal operating conditions, and then generally may return to its original shape without failure.

In certain embodiments, a device assemblage is disclosed, having a core structure that may comprise an assembly of parts that may be coupled and/or placed inside a container to add additional functionalities such as providing structural support or by transforming the container into a "fail-safe" container. In certain embodiments, the container may be pressurized under normal operating conditions. In certain embodiments, a container insert may provide for fail-safe operations and/or provide an internal structure to reduce the weight of a typical container used in many applications and industries. In certain embodiments, the overall geometry of the core structure and designs may be based on a number of factors such as: ease and cost of manufacturability, safety, reliability and weight-optimization. The disclosed embodiments may be combined, reconfigured, or otherwise integrated such that elements of any portion of one design may be included, subtracted, duplicated or otherwise incorporated with the others depending on the application.

In certain embodiments, a container insert may or may not be disposed within or enclosed by, either partially or fully, a container. Container insert designs may be optimized to be light weight. They may be inserted, attached, or not into certain embodiments of a pressure container. In certain embodiments, a container insert may be optimized for light weight and may be joined, affixed upon and/or within, and/or integrated into the peripheral wall(s) and surface area of the pressure container's wall. In certain embodiments, a container insert may be designed to optimize fail-safe features may be placed into, inserted into, joined, affixed upon/within, coupled and/or integrated into and/or attached at the peripheral wall(s) and surface area of a wall of a pressure container.

In certain embodiments, a device assemblage may form a plurality of interconnected chambers, receptacle and/or cavities capable of accommodating fluid. In certain embodiments, when the device assemblage is incorporated with a largely elastic membrane, it may deflect by large percentages to flexibly relieve internal pressures by wall expansion in order to seal gaping holes, or by wall expansion and/or venting fluid out or through variable orifices within the barrier device assemblage wall(s). In certain embodiments and associated types of containers, a device assemblage may be suited for containers susceptible to inadequate quality assurances for the container wall(s) or container wall(s) that are susceptible to nominal or abnormal abuse and that accommodate hazardous, high pressure and/or volatile fluids. In certain embodiments, a container may have, at the minimum, one side to form a body in order to confine, enclose, retain, control and/or accommodate fluid(s). In certain embodiments, a container may be bulk or non-bulk, and may include, for example, railroad container, portable container, freight container, shipping container or storage container, pressure vessel, COPV, or pressurized structure, etc.

In the following description of certain embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

In certain embodiments, a generally cylindrical tank may be provided with an outer wall and domed, hemi-spheroid, or hemi-spherical ends. In certain embodiments, the tank may include a flattened or non-uniform radius of curvature at the terminal end to reduce stress at the ends of the structure. In certain embodiments an internal assembly, such as a bladder or internal partition, may be inserted inside the tank. The internal assembly may be used to subdivide the interior cavity of the outer tank structure into smaller sub-cavities. The smaller sub-cavities may be fluidly coupled, such as through openings, valves, or penetrable/diffusive surfaces.

In certain embodiments, the internal assembly may comprise layered inserts such that the internal assembly is created by stacking the layered inserts along the longitudinal axis of the tank, with the layered inserts are oriented generally perpendicular to the tank longitudinal axis. In certain embodiments, the layered inserts may include one or more generally planar layers conforming to the interior shape of the outer structure (e.g. circular for a cylindrical tank) separated by a geometric lattice to create the smaller interior cavities. The geometric lattice may be integral to one or more of the layered planar layers or may be separately joined or stacked within the structure. Any internal configuration of smaller sub-cavities is permissible, although exemplary configurations are disclosed herein.

The internal assembly may be surrounded by a core structure to enclose the internal assembly before inserting into a tank outer structure. Thus, a multiple layered tank wall may be formed with an internal assembly structure subdividing the interior cavity enclosed by the tank wall. The tank wall may comprise one or more layers to take advantage of one or more attributes such as rigidity, support, flexibility, self-healing, energy dissipation, etc. as described herein.

In certain embodiments, an outer tank structure may be generally cylindrical with domed ends. The outer tank wall may include reinforcing fibers to provide enhanced strength. The fibers may be wound helically such that one or more fibers are wound around the length of the vessel, or in rings such that a plurality of fibers are longitudinally spaced along the length of the vessel, or combinations thereof. The fibers may be arranged such that they are perpendicular to the tank longitudinal axis or angled thereto. The fibers may also be crossed such that perpendicular circumferential rings are used in conjunction with one or more angled fibers (either rings or helically wound). In certain embodiments, two opposing helical windings may be used such that a criss-crossed pattern of fibers is created around the circumference of the tank structure. In certain embodiments, an angle of the fiber to the longitudinal axis is between, for example, 40 and 70 degrees, 50 to 60 degrees, or approximately 55 degrees. In certain embodiments, a combination of hoop fibers perpendicular to the longitudinal axis, as well as opposing helical windings approximately +/−55 degrees to the longitudinal axis may be combined to reinforce the tank wall.

In certain embodiments, the tank structure may comprise a rigid material while an insert assembly may comprise a flexible material. In certain embodiments, rigid and flexible are generally intended to be in contrast to each other, such that the rigid material supports the vessel and does not generally move or flex on a macro level during normal operation and is more rigid than the flexible material. In certain embodiments, the flexible material may generally be intended not to flex or move during normal operation but is intended to flex and absorb impact or other failure mode condition more than the rigid material without failure. In certain embodiments, flexible materials may include without limitation those that move under an applied stress, such as rubber, elastomers, low modulus resins, sealants, high modulus polyethelene, hyperelastic materials, hyperplastic materials, or superplastic materials. In certain embodiments, the flexible may be chemically stable with respect to the substance to be carried in the container and may not degrade due to chemical reactions with the substance to be carried or due to physical phenomena like low or high temperature extremes.

In certain embodiments, the insert assembly material may be configured to stretch during detonation or burst events and flex during impact to absorb the associated energy of such catastrophic events. The insert assembly material may have a high rupture strain such that catastrophic failure is avoided in most catastrophic events even after the composite material of the rigid tank wall may have failed locally. In certain embodiments, the flexible material may permit elongation without failure or rupture of over 100%, such as up to 200-500% or more to absorb such catastrophic events. In certain embodiments, the combination of the flexible insert assembly and a layered vessel wall including a flexible liner and rigid outer structure may prevent catastrophic failure of the entire container. In addition, damage progression may be stabilized and even sealing of localized failures may be achieved.

In certain embodiments, the flexible insert assembly may comprise a material that can deform and stretch under an applied force and may therefore absorb detonation and burst events without failure or rupture. In certain embodiments, flexible materials may not permanently deform under an external load, such that in certain embodiments, the material may also approximately return to its previous configuration after the applied force is removed. In certain embodiments, portions or all of the insert assembly may comprise a hyperelastic material that generally maintains its shape during normal operation, deforms and/or stretches upon an applied force above normal operation, and returns generally to its pre-deformed/pre-stretched configuration after the applied force is removed. In certain embodiments, the hyperelastic material may stretch up to 200-300% or more.

In certain embodiments, the assembled vessel may comprise an outer rigid tank wall, an inner flexible tank wall, and an internal flexible assembly. The vessel may comprise one, two, or more openings for passing a fluid or gas, and/or inserting and removing the fluid or gas from the interior of the vessel. The internal flexible assembly may generally subdivide the interior cavity defined by either the outer or inner flexible tank wall into a plurality of smaller interior sub-cavities. The smaller interior sub-cavities may comprise any configuration, shape, orientation, or number and may generally be uniform and/or variable as dictated by the application. The smaller interior sub-cavities may substantially subdivide the entire interior cavity of the tank, or may be localized in one or more regions of the tank. For example, for a pressure vessel, the smaller interior sub-cavities may be across the entire interior of the vessel cavity. In certain embodiments, in transportation applications, such as pipes, the central interior portion of the pipe may remain relatively free, such that only an exterior perimeter of the cavity is subdivided to reduce fluid flow interference during normal operation. The rigid tank wall, inner flexible tank wall, and/or internal flexible assembly may comprise one or more portions that are integrated, separated, attached, connected, or otherwise configured to create the assembled vessel.

In certain embodiments, the container insert can conform to any container shape or design, including but not limited to closed vessels of ovoid, rectangular, spherical, and combinations thereof or open vessels such as pipes, tubes, tanks, etc. In certain embodiments, a container insert can be disposed in an irregularly shaped contained while still providing protection from a catastrophic event, including but not limited to collisions, accidents, impacts, pressure container failures or explosions such as detonations, or other catastrophic incidents.

In certain embodiments, the internal flexible assembly may comprise stacked planar inserts that may create generally parallel panels along the assembled vessel. The planar inserts may be separated by facing inserts that together with adjacent planar inserts may create and define the smaller internal cavities. One or more planar inserts may be integrated with, attached to, or contact one or more adjacent facing inserts. Exemplary facing inserts may comprise walls perpendicular to the planar inserts. The planar inserts and facing inserts may comprise flexible materials that deform under forces outside those experienced under normal operation of the assembled vessel. In certain embodiments, a planar insert and adjacent facing insert may be integrated and formed as a monolithic unit. Alternatively, planar inserts and facing inserts may be separately formed and coupled directly or indirectly together or positioned in direct or indirect contact.

In certain embodiments, the internal flexible assembly may comprise a ring configuration that is inserted generally as an internal liner into an outer supporting structure. The ring configuration may be deformable for insertion such that its insertion size may be reduced from its deployed size. The internal flexible assembly may thereafter be deformable in response to an event outside of the normal operating parameters, such as temperature and pressure to minimize damage cause by the event.

In certain embodiments, the flexible assembly may comprise a composite or layered structure in which one or more rigid structures, one or more flexible structures, one or more coatings, or combinations thereof are used in combination. For example, a rigid core may be used with a flexible liner or layer thereover. Alternatively, multiple flexible materials may be layered to provide various combinations of rigidity and flexibility to accommodate different failure modes. A coating may also be used to provide desired material characteristics, including, but not limited to, corrosion resistance, self-sealing puncture or failure remediation, etc.

The plurality of smaller internal sub-cavities may be in communication with one or more other internal sub-cavities. In certain embodiments, holes, ports, or valves may be used to pass the enclosed fluid or gas between internal sub-cavities. The internal sub-cavities may also be in communication by the permeability of the material selection compared to the contained material. In certain embodiments, hydrogen may pass between the contacts of one or more planar and/or facing inserts as described herein such that surfaces of the actual inserts need not comprise passages. The contacts between planar and/or facing inserts may comprise a material to generally couple and fully separate the layers with respect to each other, but still be permeable to the carried fluid or gas such that adjacent cavities flow fluid or gas between each other but may not physically separate during the deformation of an event outside of normal operation to contain and dissipate the associated energy of such an event.

In certain embodiments, a container may have a longitudinal axis, such that a dimension along the longitudinal axis is longer than a radial dimension perpendicular to the longitudinal axis. One or more longitudinal passages may be positioned parallel to the longitudinal axis, and may run along the longitudinal axis, or may be offset therefrom. The one or more longitudinal passages may be used to insert and remove contained fluid or gas from the assembled vessel. In certain embodiments, one or more longitudinal passages may be configured to permit fluid transport through the one or more longitudinal passages to one or more of the sub-cavities. The one or more sub-cavities may be connected radially and may allow for transport of fluid from the one or more longitudinal passages to the one or more sub-cavities. In certain embodiments, the passage may be defined by an interior wall. The wall of the one or more longitudinal passages may be in common with each of a plurality of interior sub-cavities defined by a flexible internal assembly positioned between the central passage and an exterior wall of the vessel. In certain embodiments, the flexible internal assembly may circumscribe the one or more longitudinal passages and be positioned between the interior wall and an exterior wall of the vessel. The plurality of interior sub-cavities may be an interior most set of cavities such that another one or more cavities are positioned between the interior most set of sub-cavities and an outer wall of the vessel. The interior sub-cavities may be a subdivision of the interior space between the one or more longitudinal passages and an exterior wall of the vessel such that all of the sub-cavities share a wall common to the central passage. In certain embodiments, the wall in common between the one or more longitudinal passages and the interior sub-cavities comprise a communication mechanism, such as a port, hole, valve, etc. to facilitate transport of the inserted fluid or gas to the interior sub-cavities. If additional sub-cavities are in between the interior sub-cavities and the exterior wall, the interior sub-cavities may similarly comprise a communication mechanism between sub-cavities or may rely on the general dispersion properties of the fluid or gas across boundaries or along seams of adjacent cavities.

In certain embodiments, one or more axial orifices may be included to regulate pressure and may act as a baffle and retard shockwave propagation in case of an internal detonation. In certain embodiments, fuel in sub-cavities may be transferred from a central pipe located coaxially within a fuel container. The central pipe may be perforated with holes coincident with each fuel sub-cavity. The holes may be left open or may be closed with valving. In certain embodiments, the central pipe may be connected to one or more sub-cavities by a plurality of micro-perforations. In certain embodiments, micro-perforations may occupy no more than about 5% of the surface area of the central pipe in contact with one or more sub-cavities. In certain embodiments, the central pipe may be replaced or supplemented by one or more longitudinal passages for transferring fuel to and from fuel sub-cavities. In certain embodiments, a central fuel passage may be attached to a fuel talk outer wall at a dome apex using valving similar to that used in natural gas storage tanks.

In certain embodiments, for a case of a detonation occurring within the internal assembly, shock waves may be diffused between the internally subdivided chambers through the thin and/or layered walls. The shock wave may be mitigated through diffusible strips, walls, or other interfering surfaces to absorb the impact, enhance, flexibility, and/or stiffness as dictated by the application and associated potential harm. In certain embodiments, an internal detonation within one of the interior sub-cavities may be partially absorbed by temporarily deforming and expanding the internal structural surfaces nearest the detonation. In certain embodiments, the proximate most walls enclosing the detonation may expand (blow up like a balloon) which may absorb some of the energy and may reduce local pressure by increasing local volume. After denotation, the walls may return to their original or near original configuration, while the next most proximate chambers surrounding the detonation chamber or that share a common wall with the chamber enclosing the detonation would similarly begin to deform as the shock wave propagates through the structure. In certain embodiments, some of the energy of the detonation will be dissipated through the deformation of the internal structure, so that the deformation of the propagating shock wave is diffused as subsequent chambers are encountered and deformed.

Although embodiments of the invention may be described and illustrated herein in terms of cylindrical, spherical, domed, or combination vessels, it should be understood that embodiments of this invention are not so limited, but are additionally applicable to various containment vessels, transport configurations, shapes, etc. Certain embodiments may be applied to closed vessels of different shapes such as ovoid, rectangular, spherical, and combinations thereof, or open vessels such as pipes, tubes, tanks, etc. Furthermore, although embodiments of the invention may be described and illustrated herein in terms of applications of volatile materials such as hydrogen, it should be understood that embodiments of the invention are also applicable to other enclosures in which the integrity of the vessel is preferably maintained even under extreme conditions such as localized and generally applied forces, from pressurization, detonation, impact, etc. Similarly, although embodiments may be described herein as enclosed pressure vessel for transport of volatile material such as hydrogen, other applications may include aerospace structures, nuclear waste/generator cylinders, liquid rocket motor containers, fuel cells, liquid batteries, pipes, etc. These applications may include, without limitation, one, more, or any combination of features described herein and may be generally reconfigured to enhance the desired characteristics associated with such an application.

In certain embodiments, a cargo container may comprise an internal structure according to certain embodiments described herein. The cargo container may be used to enclose cargo in transport and prevent or reduce damage from the transported material. Therefore, the cargo container may keep passengers safe when explosive materials are transported, intentionally or unintentionally.

In certain embodiments, the core structure of the device assemblage may generally maintain its shape, position and configuration during normal operating conditions throughout the life of the pressure container. In certain embodiments, the materials used in the construction of the device assemblage may yield during normal operating conditions of the pressure container, however in most cases it is expected to return to its original designed shape except during abnormal loading conditions or adverse exposure to the pressure container.

In certain embodiments, non-exclusive features of the device assemblage may include, without limitation: 1) wall (s) comprising exceptionally more specific surface area inside the container; 2) additional wall(s) comprising motion stabilization or dampening against slosh during transportation, collision or impact; 3) additional wall(s) that comprises core structural stability against container wall implosion and/or expansion; 4) additional wall(s) comprises the improved stiffness and resistance to fracture, buckling and/or burst of the container wall(s); 5) additional wall(s) that comprises restriction of back draft(s) that may include rapid re-introduction of oxygen or an oxidizer(s) into a container wall(s); 6) additional wall(s) comprises impedance against flame propagation through-out the embodiment of a pressure container wall(s); 7) additional wall(s) for kinematic fluid control between chambers; 8) additional wall(s) comprising balanced temperature conduction and heat transfer during fast fill; and 9) any combination thereof.

In certain embodiments, the device assemblage may comprise plural variable orifice(s) [orifice(s) that stretch from an "as built" size and shape] that may control and allow the contained fluid to flow or vent between connecting chambers or exhaust into the atmosphere, depending on the desired outcome and requirements for the application of the pressure container.

In certain embodiments, fail-safe features of the device assemblage, when properly constructed, may prevent, eliminate, or absorb a large fraction of the total potential energy (i.e. mechanical energy) released during or after a fracture or collapse of a pressure container due to such things as: faulty container, damaged container, over pressurization of container, collision/impact to container. The potential energy stored in a common non-bulk compressed fuel container, having large compressed pressures may be rendered non-hazardous in most synergistic (i.e. realistic) auto collision or impact scenarios when a pressure container incorporates exemplary fail-safe features described herein. //////////

In certain embodiments, a material used in the construction of the device assemblage wall(s) may have characteristics that when it compresses or expands from its nominal, as built state, its shape may first resist and strain against motion or deflection, and then expand more freely with strain during large deflection before finally resisting again with less deflection and larger strain before fracture.

When placed inside a hollow pressure container cavity, certain embodiments of the device assemblage may maintain its general shape, position, and configuration during normal operating and environmental conditions, but may deform, compress, deflect or stretch in any direction if a load impacts the pressure container wall or if pressure inside the pressure container wall exceeds its material's elastic strength and stiffness. In certain embodiments, substantial and large deformation of the device assemblage may occur when the pressure differential inside the device assemblage expands the wall(s). The materials used in the wall(s) of the device assemblage core structure may resist, deflect, deform, contract or stretch at large scale.

In certain embodiments, if the pressure container walls are compromised in any manner and fail, the device assemblage wall(s) and core structure may: 1) generate blow out shock absorbing buffers; 2) generate expandable shock absorbing chambers; 3) provide built in pressure relief for expanding fluids; 4) exponentially reduce heat flux, fire growth and engulfment; 5) significantly reduce the damage foot print in the event of a catastrophic incident; 6) relieve internal pressures and prevent the pressure container from exploding during chamber detonation and loss of container wall; 7) impede or restrict heat conduction or convection from propagating throughout the contained fluid; 8) generate expandable and deformable chamber walls, capable of sealing puncture(s) that may occur within the stiff, and strong container wall(s); 9) prevent high speed blast pressures that could result in lethal blast waves or projectiles; 10) eliminate the need to protect or shield against low velocity impacts, small weapons or large weapon ammunitions; 11) eliminate the need for an external pressure safety relief devices; and 12) any combination thereof.

In the following description of certain embodiments, reference is made to the accompanying sketches, pictures and drawings which form a line (i.e. edge), component, part or system as described herein, and in which it is shown by way of illustration in certain embodiment(s) in which the invention can be practiced. It is also to be understood that other embodiments can be contemplated with structural changes made without departing from the scope of the embodiment(s) of this invention.

A pressure container and its dome ends can take on many shapes. In certain embodiments, FIG. 1 displays a longitudinal cross section of a composite cylinder 100. The composite cylinder may be a cylindrical-shaped pressure container with curvature and thickness of a typical cylindrical pressure container. The pressure container may be monolithic and hollow, having two geodesic end domes 101, and non-uniform thickness and/or radius 103 of curvature. Such a typical pressure container may be used in the construction of a filament wound cylinder. The pressure container end domes 101 and its cylinder walls, section 102, may be rigid, stiff, and strong, and may be designed to maintain their relative dimensional shape during normal operating conditions.

Figure 2:
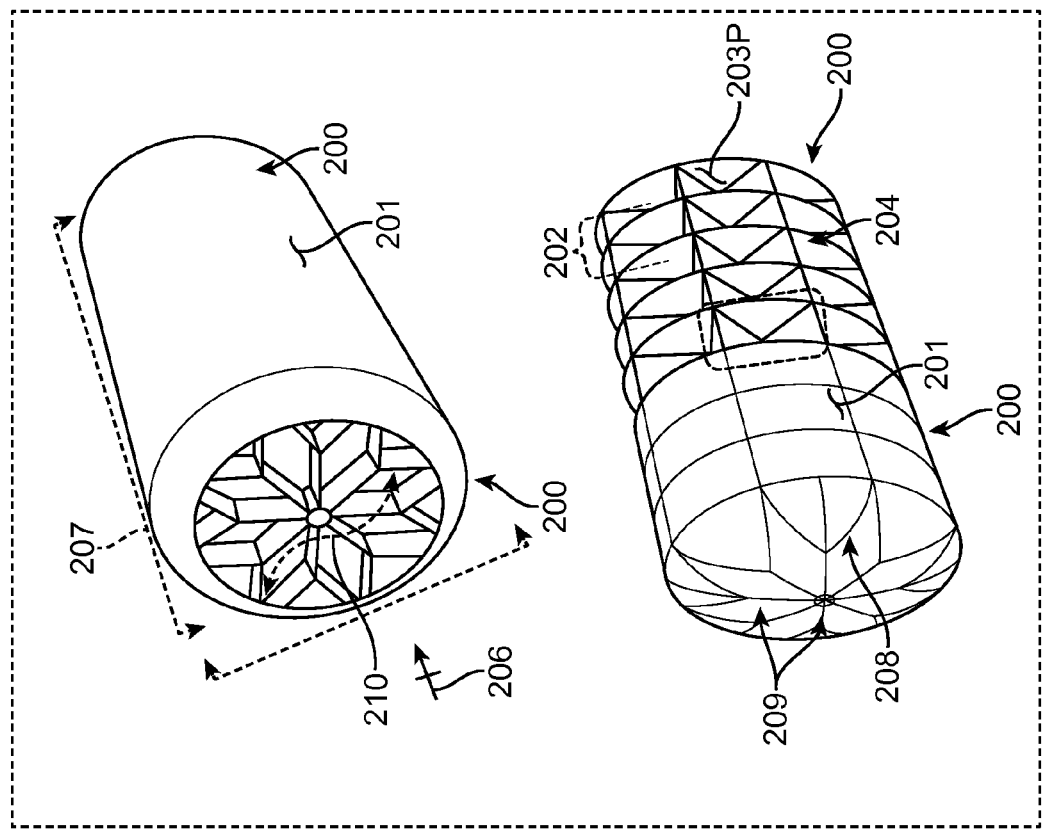
FIG. 2 depicts three-dimensional views of a cylinder-shaped device assemblage in accordance with certain embodiments.
Figure 2:
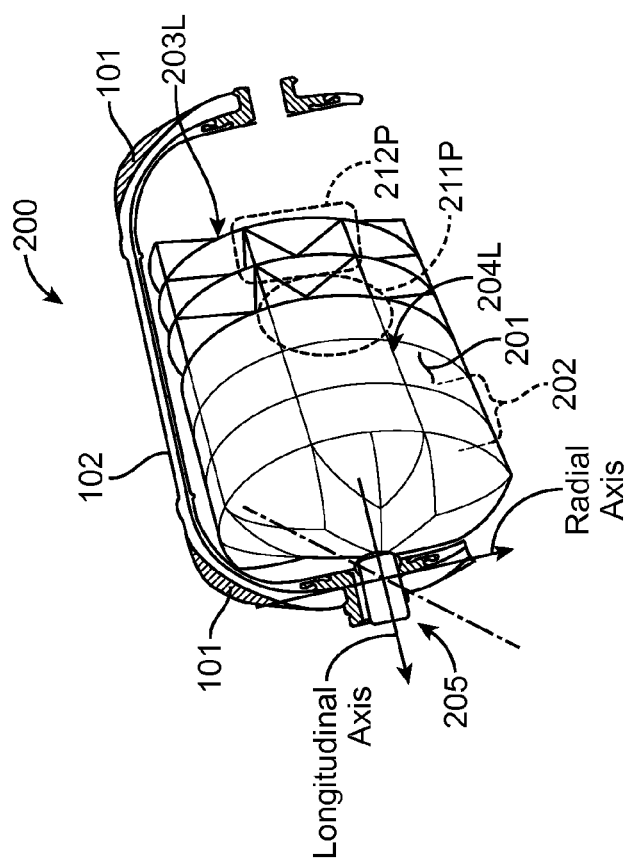

In certain embodiments as shown in FIG. 2, inside the cylindrical pressure container 100 there may be a partial three-dimensional view (3-D) of a cylinder-shaped device assemblage 200, with and without the device assemblage 200 outer walls 201, located inside the partially sketched hollow cross-section of a cylindrical pressure container 100. The cylinder-shaped device assemblage 200 is also depicted in two other 3-D views, views that depict the cylinder-shaped device assemblage 200 not enclosed by the cylindrical pressure container 100. Both views are partially enclosed by the cylinder-shaped device assemblage 200 outer-wall 201. The cylinder-shaped device assemblage 200 core structure may subdivide a single interior cavity of a typical monolithic pressure container 100, converting the single cavity of a monolithic pressure container 100 into multiple sub-cavities or chambers. The additional sub-cavities or chambers are provided or added by the cylinder-shaped device assemblage 200, the sub-cavities are smaller and may be fluidly coupled by openings, orifices, valves, or penetrable/diffusive surfaces for flow regulating and conditioning. In certain embodiments, the one or more sub-cavities may be fluidly coupled by a plurality of micro-perforations. In certain embodiments, micro-perforations may occupy no more than about 5% of the surface area of the central pipe in contact with one or more sub-cavities. The micro-perforations may permit pressure equalization among sub-cavities during normal operation and may provide pressure relief while dissipating and/or absorbing pressure or explosive energy during a catastrophic event. In certain embodiments, one or more sub-cavities may be fluidly coupled in an axial direction, a radial direction or both.

In the construction of certain embodiments as shown in FIG. 2, the cylinder-shaped device assemblage 200 may be organized into circumferential-shaped lines 203L or into arcuate sectionals 202, the sectionals may include lattice-like structures, such that the cylinder-shaped device assemblage 200 may be an assembly of vertical, horizontal and angled lines. Vertical lines may be spaced by internal lattice-like structures, where the vertical lines are parallel to the radial-axis, the horizontal lines may be parallel to the longitudinal axis and angled lines may not be parallel or perpendicular to the longitudinal axis and therefore off-axis the longitudinal and the radial-axis. The vertical lines in the radial direction may be the edge of a circumferential-like plane 203P, the horizontal lines may be the edges or base length of a trapezoid plane with both its ends (i.e. the height or shortest of the two lengths of a trapezoid) having arc-like lines 204. In certain embodiments, the arc radius dimension may be the three dimensional radius vector of a geodesic dome 208; the major radius of the geodesic circumference is shown with two lines 209. The horizontal planes 204 shown in FIG. 2 may be off-axis of the longitudinal center of the cylinder-shaped device assemblage 200 and may not be affixed to the fill or discharge pipe or tube 205.

In certain embodiments, the cylinder-shaped device assemblage 200 may be surrounded and affixed by an outer-walls 201, such as an outer membrane, liner or barrier, enclosing the internal assemblage of the cylinder-shaped device assemblage 200. In certain cylinder-shaped applications, the device assemblage 200 may be attached at its outer surface wall and may form a shape that follows the inside contour of the pressure container surface area walls. In this way, the device may be inserted into, joined, affixed upon/within, coupled and/or integrated into and/or attached at the peripheral surface edge and/or area of the cylinder-shaped device assemblage 200 outer-walls 201 and/or pressure container's 100 cylinder walls 101, 102. In certain embodiments, the cylinder-shaped device assemblage 200 outer-walls 201 surface area may or may not have a gap between the inside surface area provided by the pressure container 200 inside cylinder and end dome walls 101, 102 and the surface area provided by the cylinder-shaped device assemblage 200 outer-walls 201.

Figure 3:
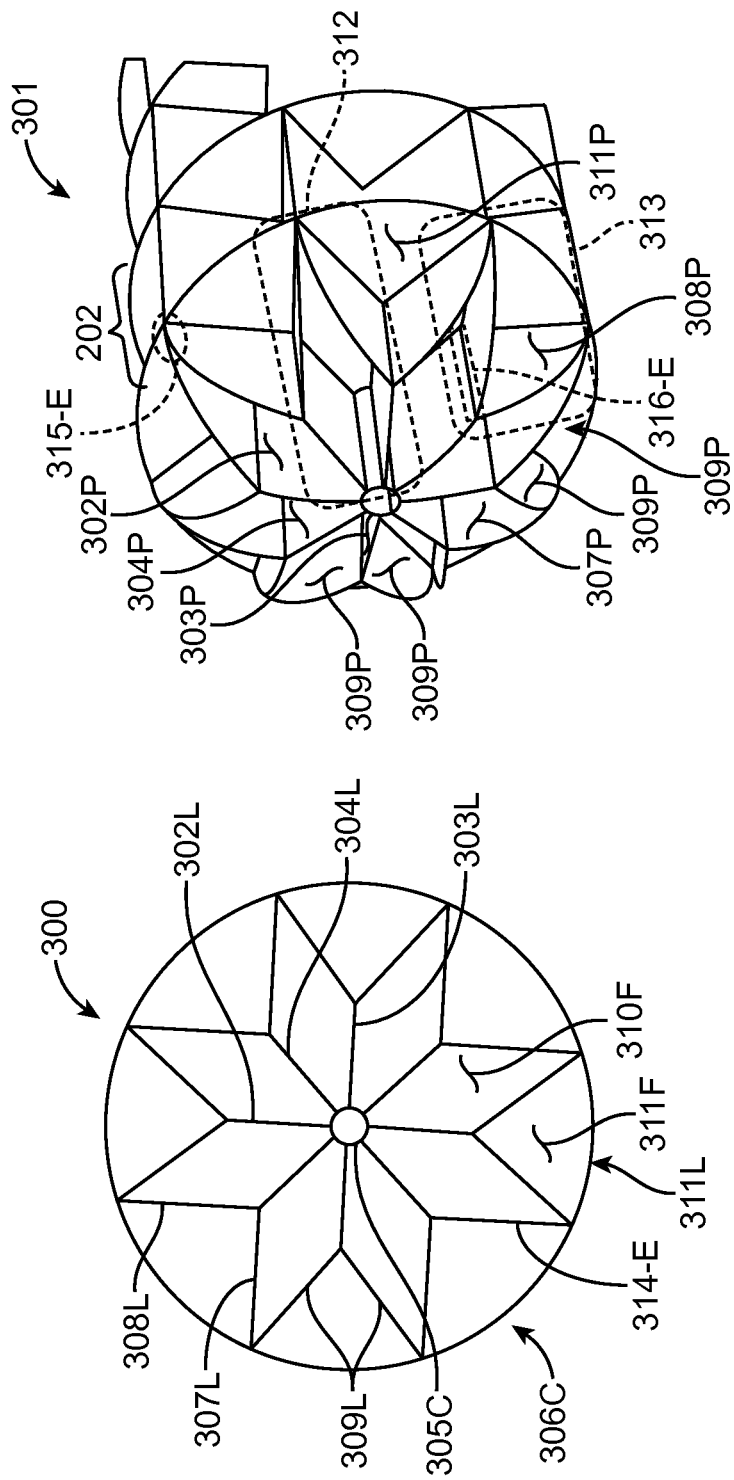
FIG. 3 depicts two exemplary frontal views of a device assemblage end dome of FIG. 2 in accordance with certain embodiments.

In certain embodiments, FIG. 3 illustrates two exemplary frontal views of the device assemblage end dome 210, with different viewpoints displayed. The cylinder-shaped device assemblage 200 rear end dome 210 is not shown in FIG. 3, only a frontal "i.e. head on" view of the end dome 210 is shown. One view is a two dimensional (2-D) cross sectional view 300 of the cylinder-shaped device assemblage 200 end dome 210. This 2-D view 300 is a 2-point perspective where the sides and top or bottom extend into the object, as can be seen. There may be a number of vertices, lines, tangent lines and off-axis lines in the 2-D device end dome 210 that define the object. The other view is a three dimensional (3-D) view 301 of a frontal view 206 of the end dome 210 and a partial view of the cylinder-shaped device assemblage longitudinal side view 207. This is a typical 3-point perspective of the device assemblage 200 where the sides appear to be oblique from side to side and top to bottom. The partial view provides detail lines that represent the larger shaped rectangular plane 211P that is located on a triangular-shaped prism(s) 212. This plane 211P is arcuate and congruent to the circumferential-shaped plane 203P. In certain embodiments, the construction and design of the cylinder-shaped device assemblage 200 may improve manufacturability and may optimize the cylinder-shaped device assemblage 200 for weight efficiency by using lattice isogrid-like sectionals.

In certain embodiments as shown in FIG. 3, the cylinder-shaped device assemblage 300 is shown without outer-walls 201 of the cylinder-shaped device assemblage 200 or pressure container 100 cylinder and end dome wall(s) 101, 102. The 2-D cross section view reveals that the end dome 210 exhibits two vertical lines 302L, parallel to the radial-axis; two horizontal lines 303L, parallel to the radial-axis; and four angled lines 304L, parallel to the radial-axis; all having one end of their line connected to the smaller circumferential-shaped line 305C and the other end connected to a vertex on a triangular shaped polygon face. There also may be four horizontal lines 307L that may be off-set the center of the longitudinal axis, and four vertical lines 308L, off-set from the longitudinal axis, and eight angled lines 309L, off-set from the longitudinal axis; the eight angled lines may be divided into pairs and joined together at a vertex at one end of the lines and the other end of the two lines may connect at vertices on the larger circumference-shaped line 306C. The final formation may ressembles the face of a triangular-shaped face with one edge being an arc 311F. The arc may be a "sectional arc" line from the larger circumference-shaped line 306C. One of the four horizontal lines and one of the four vertical lines may pair up and join at one end of a vertex with other ends connecting to vertices on the larger circumference-shaped line 306C.

In certain embodiments, there may be eight rhombus faces 310 inside the cross sectional area of the larger circumferential-shaped line 306C, eight triangular-shaped faces with an arch 311F and one smaller cross sectional area in the dead center of the circumferential-shaped line 305C. The rhombi faces may encircle around the smaller circumferential-shaped line 305C, and the 8 polygon faces 311F may encircle and connect to two rhombus faces 310. These faces may be structured and positioned such that each end of the sectional arc lines are attached end to end to form the larger circumferential-shaped line 306C.

In certain embodiments of cylinder-shaped device assemblage 200, each sectional arc line may be approximately $\frac{1}{8}^{th}$ the total circumferential length that may be produced by the larger circumference-shaped line 306C. In certain embodiments, this circumferential length may be equal to the inside circumferential length of the cylinder-shaped device assemblage outer surface with walls 201; However, in certain embodiments, the edge, as viewed in the 2-D circumferential-shaped line 305C or 306C, may have "perpendicular edges" that are indirect or non-continuous that may form for example, a zig zag or herringbone shaped edge affixed to the cylinder-shaped device assemblage walls 201 and/or pressure container 100 cylinder and end dome walls 101, 102.

In certain embodiments, the 3-D view 301, as shown in FIG. 3, reveals that rhombus faces 310 may have four planes perpendicular and attached at certain combinations of lines 302L, 303L, 304L, 307L, 308L and/or 309L to produce 8 rhombohedrons 312. This view also illustrates that the line 311L form at least one plane 311P that has an edge congruent to the inside radius or diameter of the pressure container 100 cylinder section 102.

In certain embodiments, the planes 302P, 303P, 304P, 307P, 308P and/or 309P perpendicular to a rhombohedron 312 may share opposite and parallel faces of planes 311P. Each rhombohedron 312 may have two parallel rhombus faces 310 and four of the known perpendicular planes as mentioned above. The four planes that are perpendicular to the rhombohedron faces 312 may have edges that attach at and into the larger concentric circumferential-shaped plane 311P, with its opposite edges as shown in the frontal view 206 having an edge 314-E that may be congruent to the inside radius 103 of the pressure container 100 geodesic end dome 101. Additionally planes 307P and 309P, or 308P and 309, may join at arc edges 315-E, while the other end of these planes 307P, 308P or 309P may join with planes 302P, 303P or 304P to form an edge 316-E. The 3-D view 301 also reveals that the triangular-shaped faces 311F may have perpendicular planes attached at lines 307L, 308L and 309L, with each perpendicular plane having two straight lines and one arc line; the arc line may be congruent to the inside radius 103 of the pressure container 100 geodesic end dome 101.

Figure 4:
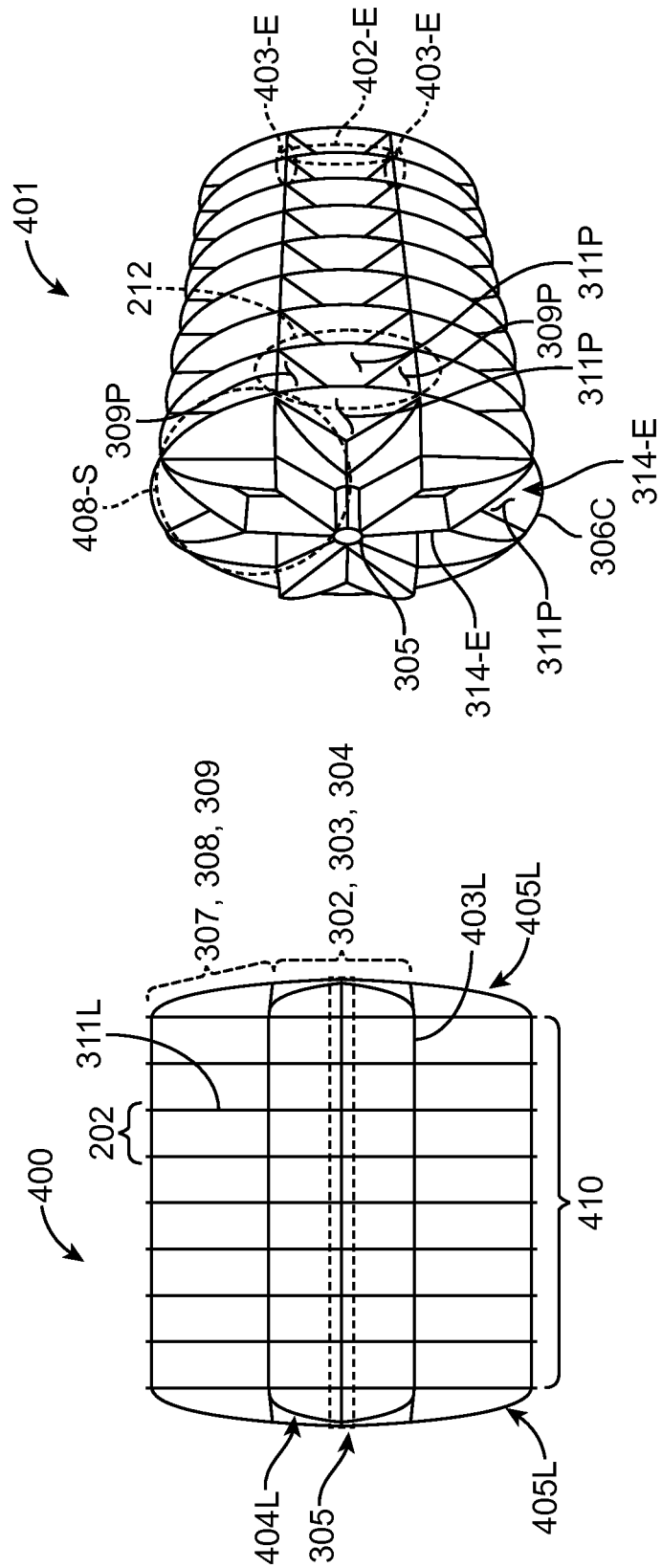
FIG. 4 depicts two longitudinal side views of the device assemblage of FIG. 2 in accordance with certain embodiments.

In certain embodiments as shown in FIG. 4, there are two longitudinal side views 207 of the device assemblage 200. The objects shown display different viewpoints of the cylinder-shaped device assemblage 200. The 2-D view displays a cross section view of two end domes 210 and a cylindrical section 410. This 2-D view 400 is a 2-point perspective where the sides and top or bottom extend into the object. There are a number of vertices, lines, tangent lines and off-axis lines in the 2-D device longitudinal side view 210 that define the object. In certain embodiments, the other view in FIG. 4 is a 3-D perspective view 401 that displays four planes in a triangular-shaped prism(s) 212—two planes are parallel $309P_{bottom}$, $309P_{top}$ and two planes are perpendicular $311P_{left}$, $311P_{right}$ the longitudinal axis. A 3-D end dome view 210 an view of the cylinder-shaped device assemblage 200 longitudinal side 207 is shown in 3-D.

The cylinder-shaped device assemblage 200, as seen in FIG. 4 is shown exposed without its outer-walls 201 or the pressure container 100 and end dome walls 101, 102. The 2-D cross section view displays the cylinder-shaped device assemblage 200 exhibiting a number of distinct vertical lines 311L, horizontal lines 403L, semi circular-like lines 404L and two geodesic-shaped lines 405L at both ends of the object. In certain embodiments, the rhombus faces 310 shown in FIG. 3 may be perpendicular to the longitudinal axis. Each face may have planes that are perpendicular to form a rhombohedron 312; the faces shown in this perspective may mask other rhombohedron 312 that extend into the core structure of the object. The 3-D view 401 reveals that the horizontal lines 403L, as shown in the 2-D view 400, may be the outer edge 403-E of rhombohedrons 312 and that the vertical lines 311L, as shown in the 2-D view 400, may be the outer edge 402-E of the larger circumferential planes 311P$_{left}$,311P$_{right}$. This view 401 also reveals that triangular-shaped prism(s) 212 may exist between the the rhombohedron 312. These prism(s) 212 may be between circumferential-shaped plane(s) 311P and mY be located within the outer cylindrical section 410 of the cylinder-shaped device assemblage 200. The rhombohedrons may result from the extrusion of the herringbone structure. The herringbone structure may segregate the container into different sub-cavities and may add barriers between the sub-cavities in case of abrupt pressure change (e.g. leakage, external impact, or internal detonation). The configuration may adapt to rapid shape change. In certain embodiments, the plurality of sub-cavities may take the form of one or more triangular prisms and/or one or more rhombohedrons that may maintain the shape of the internal structure and may transform to expandable and deformable chamber wall(s) which may expand and deform, under pressure differentials, to transform into other shapes and forms that may absorb shock by elastic/elasto-plastic deformations and by reducing internal pressure through volumetric expansion of the chamber or buffer wall(s). In certain embodiments, the internal assembly of flexible triangular prism(s) and rhombohedron(s) may provide stiffness, rigidity, damage confinement and rupture control. In certain embodiments, an elastic wall surrounding the plurality of sub-cavities may be aligned with the inside wall(s) of a rigid container, and may protect the liner and function as a second line of defense.

One of ordinary skill in the art will recognize that the foregoing shapes are not limiting and that other designs including without limitation inner herringbone, outer herringbone, single wine container, and egg crate alternately may be used in certain embodiments.

In certain embodiments, the 3-D view 401 of the triangular-shaped prism(s) 212 displays four visible planes that may include planes 307P, 308P, 309P and 311P. The fifth plane is not shown in view 401; it could be described as the larger rectangular-shaped plane 211P as shown in the 2-D view of FIG. 2. In certain embodiments, planes 307P, 308P and 309P may have equal lengths and width and may be attached in pairs between two circumferential shaped plane(s) 311P. The planes that form the triangular-shaped prism(s) may be attached at one end to form edge 316-E with the other edge of the two planes spaced apart by the length or width of plane 211P, the planar area is arc congruent to the inside radius or diameter of the pressure container 100 cylinder section 102.

Figure 5:
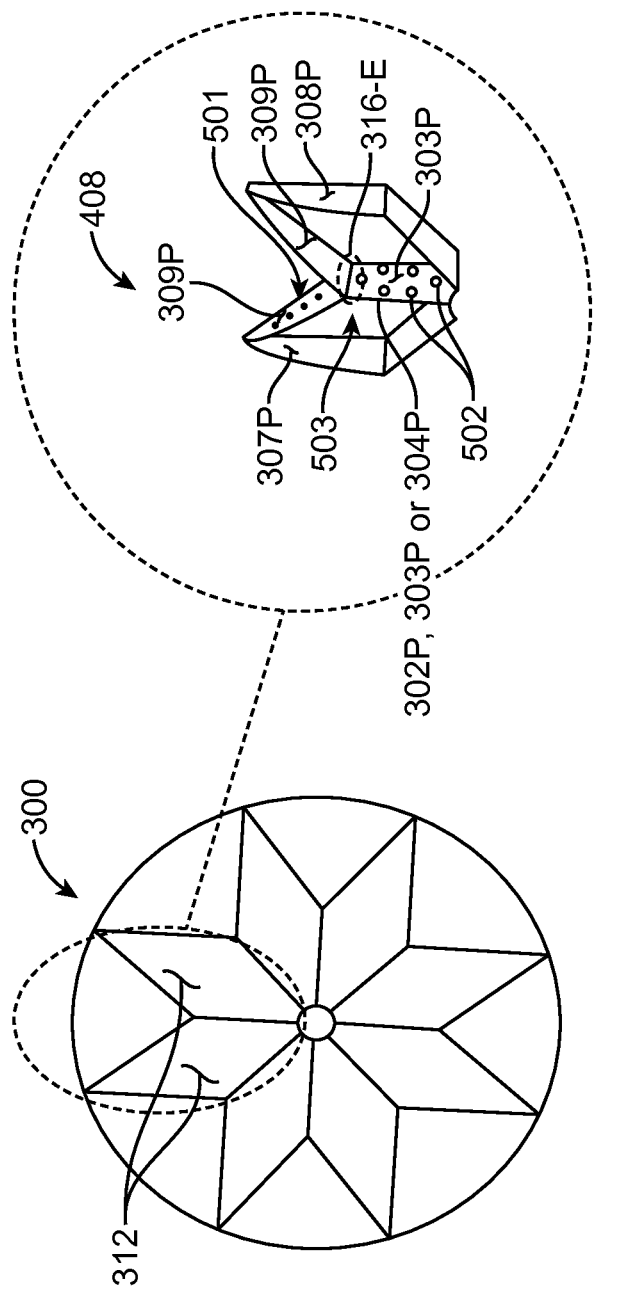
FIG. 5 depicts a sectional view of components that may be used in the construction of expandable and deformable chamber walls in accordance with certain embodiments.

In certain embodiments, a device assemblage may include certain fail-safe features within the core structure as described herein. In certain embodiments, a typical barrel-shaped pressure container 600 may have a fail-safe device assemblage that is constructed of elastic materials that may stretch by 200 to 500 percent during a catastrophic event without failing. In certain embodiments as shown in FIG. 5, a sectional view 408-S depicts components that may be used in the construction of expandable and deformable chamber walls capable of sealing certain fracture types that may create one or more holes (e.g. punctures from a forklift blade, pipe, rod, munitions, etc. that may penetrate through a relatively strong, rigid and stiff pressure container 100 walls). In the cylindrical section 410 of the cylinder-shaped device assemblage 200, there may be one or more of orifices provided in certain planes of the cylinder-shaped device assemblage 200 core structure. Certain planes 302P, 303P and 304P may have orifices 502 that may stretch larger than other orifices in other planes 307P, 308P and 309P that may have orifices that stretch much less than the orifices 501 in certain other planes. In certain planes of the cylinder-shaped device assemblage 200, planes 302P, 303P and/or 304P may have a tappered thickness 503 and/or less superior breaking strength design in with the infirm portion of the plane laying on an edge 316-E.

Figure 6:
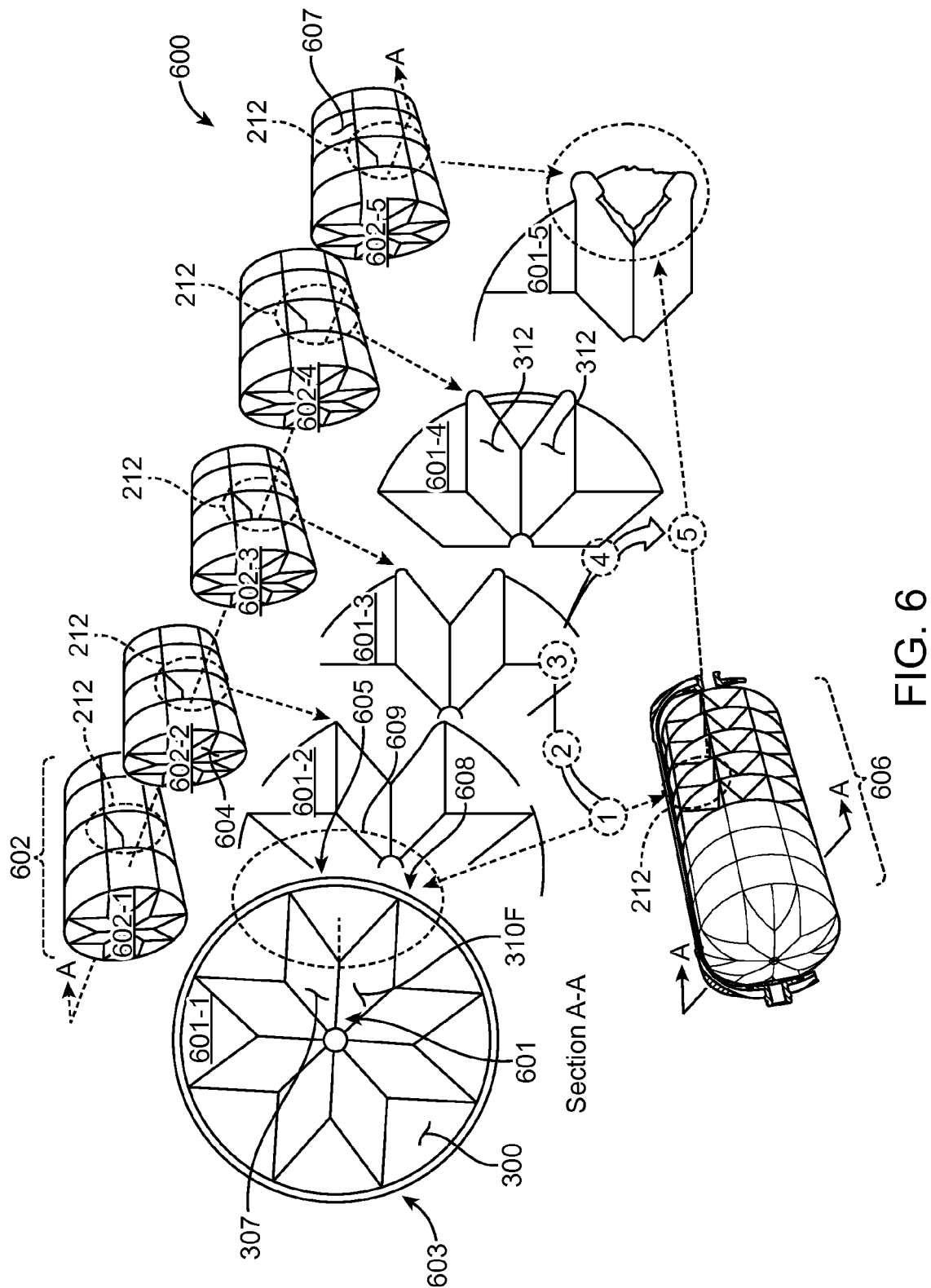
FIG. 6 depicts ten cut-away views of a pressure container illustrating consecutive stages of a catastrophic event in accordance with certain embodiments.

In certain embodiments, the cut-away view in FIG. 6 is of two pressure container types 600, 100—one is a typical barrel-shaped pressure container 600 with outer container walls 603; and the other pressure container is a typical cylinder-shaped pressure container 100 with outer container walls 101, 102. Both pressure containers are shown with fail-safe device assemblages 200, 604 and their outer-walls 201, 607. There are five 2-D cross sectional views; 601-1, 601-2, 601-3, 601-4 and 601-5 of the barrel-shaped pressure container 600, and there are also five 3-D views 602-1, 602-2, 602-3, 602-4 and 602-5 of the barrel-shaped pressure container 600. All ten views depict consecutive changes in events that may take place within (i.e. sequences 601-1 through 601-5) and outside (i.e. sequences 602-1 through 602-5) the core structure of the fail-safe device assemblage 600. Both sequences of events start with sequence event #1 and finish with event #5. In certain embodiments, the third view 606 shows a similarity in the fail-safe features for the two different types of pressure containers. This third object is a cylindrical-shaped device assemblage 200 depicted in a 3-D view. This 3-D view shows a device assemblage fractionally enclosed by the cylinder-shaped pressure container 100 walls 101, 102 with the device assemblage partially disclosed.

In certain embodiments, fail-safe device assemblages 200, 600 may be autonomous. The fail-safe features may execute when, for example, a fragment 605 from both the device assemblage walls 201, 607 and barrel-shaped pressure container 600 the size of a plane 211P are instantaneously removed from the longitudinal side-wall 207, 602 of a barrel-shaped or cylinder-shaped pressure container 600, 100. There are five 2-D sectional views 601-1, 601-2, 601-3, 601-4, 601-5 and five 3-D view; 602-1, 602-2, 602-3, 602-4 and 602-5 that depict sequences of events that are intended to graphically demonstrate some of the fail-safe functionalities.

In certain embodiments, in a first sequential event 601-1, 602-1; there may be a fragment 605 including both a piece of the device assemblage walls 201, 607 and the barrel-shaped pressure container 600. The fragment is depicted being separated from the device assemblage walls 201, 607 and a barrel-shaped pressure container 600. This is delineated in 2-D 601-1 and in 3-D 602-1. The depiction includes the device assemblage walls 201, 607 and barrel-shaped pressure container 600 (containing a fail-safe device assemblage 604) and/or a cylinder-shaped container 100 (also containing a fail-safe device assemblage 200). The fragment 605 separation leaves a gaping-hole 608 the size of a large plane 211P from a triangular-shaped prism(s). The gaping-hole 608 is on the longitudinal side 602, 207 of the barrel-shaped pressure container 600 and cylinder-shaped pressure container 100. This gaping-hole 608 triggers an autonomous fail-safe response by the device assemblage 200, 604, which begins the process 609 to seal the gaping-hole 608. The fragment separation is likely due to the escaping gas that was stored inside the triangular prism(s) 212. The two rhombohedrons $312_{top}$, $312_{bottom}$ [located at the perimeter of the triangular prism(s) 212] also begin to react by expanding and contracting.

In the second sequential event 601-2, 602-2; the smaller orifices 501 in the plane $309P_{left}$ may or may not immediately experience choked flow. This may cause the other plane $309_{right}$ to fold into the gaping-hole 608 first. The initial change in the core structure of the device assemblage may start with these two planes $309P_{left}$, $309_{right}$. The two planes $309P_{left}$, $309_{right}$ are in close vacinity of the gaping-hole 608 and they may respond immediately (i.e. an autonomous-like response) to the sudden pressure change that was inside the triangular prism(s) 212 as well as inside the remaining device assemblages 200, 600.

In the third sequential event 601-3, 602-3; the edges 403-E of two rhombohedrons continue to deform, stretch, expand and ram into the gaping-hole 608, while the two planes $309P_{left}$, $309_{right}$ surrounding the gaping-hole 608 continue to fold to form a seal at the hole.

In the fourth sequential event 601-4, 602-4; perpendicular planes 302P, 303P, 304P, 307P, 308P and/or 309P may be in-between and attached to two larger concentric circumferential-shaped planes 311P. These planes may be designed in a manner to rip away from their attached edges at both sides of the larger concentric circumferential-shaped plane 311P. This may be because the attached edges may have less superior breaking strength (the less infirm portion) designed into the attachment edges. The infirm portion of the plane 303P that is attached at edge 316-E, may tear off and separate as the two rhombohedrons $312_{top}$, $312_{bottom}$ stretch outward in the radial direction and deform, compress and wedge into the gaping-hole 608, while at the same time $309P_{left}$, $309_{right}$ continue to fold into the gapping hole to produce a seal at the gaping-hole 608.

In the fifth sequential event 601-5, 602-5; planes $309P_{left}$, $309_{right}$ may be folded into the gapping hole compressed between two rhombohedrons $312_{top}$, $312_{bottom}$ to produce a seal at the gaping-hole 608.

Figure 7:
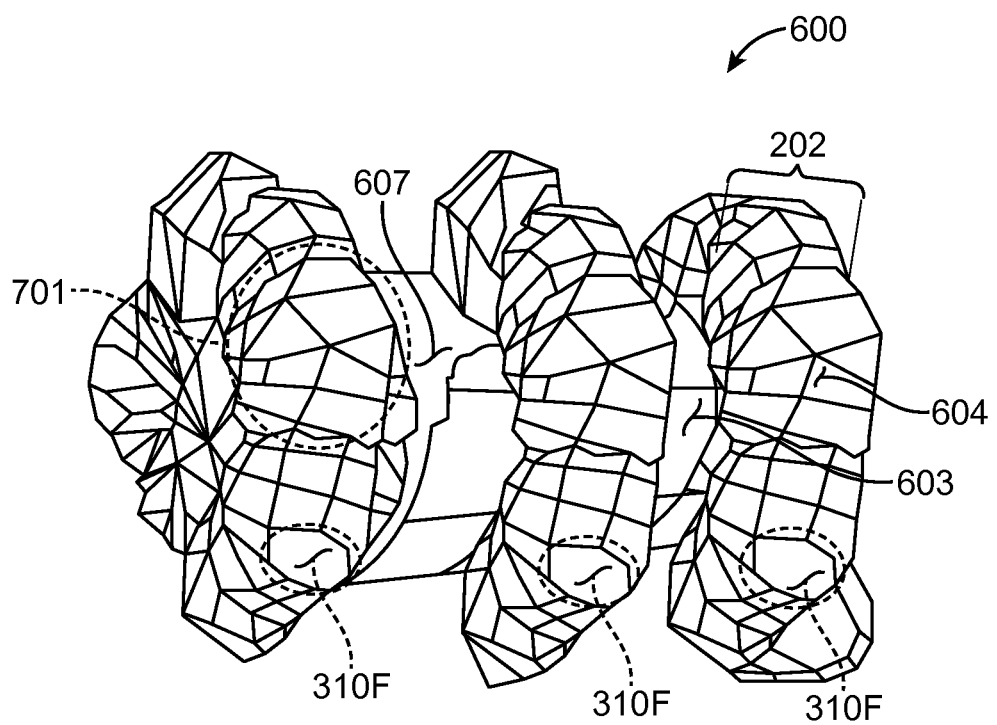
FIG. 7 depicts depicts a barrel-shaped pressure container, with outer pressure container walls that may collapse and fail in a catastrophic event in accordance with certain embodiments.

In certain embodiments, a barrel-shaped pressure container 600 may have a fail-safe device assemblage 604 that is constructed of elastic materials that may stretch by 200 to 500 percentage without failing. The device assemblage core structure may have rhombohedrons 312 and triangular shaped prism 212 that may also be known as chambers 312, 212. The reactions and results from the fail-safe device assemblage 604 may be different than that described above, and it may be independent of how the pressure container wall fails. For example, FIG. 7 depicts a barrel-shaped pressure container 600, with outer pressure container walls 603 that collapse and fail in a calamity of different ways. Despite the many possible modes of pressure container failure, the fail-safe device assemblage 604 may produce expandable and deformable chambers capable of containing high pressure in containers without ruptures. The device assemblage may transform into and/or generate expandable shock absorbing chambers 701 that have the appearance of blow out shock absorbing buffers 701 capable of containing high pressure and blasts products without ruptures in the event of a pressure container failure.

Figure 8:
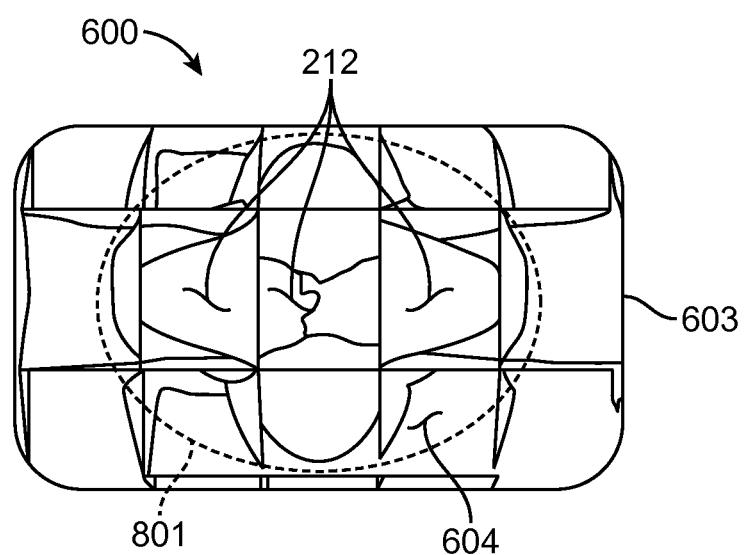
FIG. 8 depicts internal pressures that may be generated from an internal detonation may cause and result in expansion of shock absorbing chambers or sub-cavities in accordance with certain embodiments.

In certain embodiments, the fail-safe device assemblage 604 may be capable of containing an internal detonation and explosion. The device assemblage core structure may have rhombohedrons 312 and triangular shaped prisms 212 that may also be known as chambers 312, 212 that are capable of containing an internal detonation that may occur in one of the chamber(s). The internal pressures that may be generated from an internal detonation may cause and result in expandable shock absorbing chambers as depicted in FIG. 8. In certain embodiments, the section view 801 may exhibits shock absorbing expandable chambers that can expand omni-directionally and beyond the original width and length of a single chamber. In certain embodiments, the chamber may then return back to its original shape without failure of the chamber walls 212.

We claim:

1. A fail-safe container for volatile substances comprising:
    a container wall defining a cavity;
    a plurality of flexible barriers disposed within the cavity, the plurality of flexible barriers defining a plurality of sub-cavities;
    wherein the plurality of flexible barriers are configured to deform during a catastrophic event to prevent failure of the container; and
    wherein the plurality of sub-cavities comprises a first interior plurality of subcavities and a second exterior plurality of sub-cavities positioned between the first interior plurality of sub-cavities and the container wall.

2. The fail-safe container of claim 1, wherein the catastrophic event comprises at least one of a collision, an overpressure event, a detonation, an impact or an ignition of a volatile substance.

3. The fail-safe container of claim 1, wherein the at least one of the plurality of sub-cavities is configured to accommodate a fluid.

4. The fail-safe container of claim 1, wherein one or more of the plurality of sub-cavities comprises at least one triangular prism.

5. The fail-safe container of claim 1, wherein one or more of the plurality of sub-cavities comprises at least one rhombohedron.

6. The fail-safe container of claim 1, wherein one or more of the plurality of sub-cavities is configured to deform elastically during the catastrophic event.

7. The fail-safe container of claim 1, wherein one or more of the plurality of sub-cavities is configured to deform plastically without failing during the catastrophic event.

8. The fail-safe container of claim 1, wherein at least one of the plurality of flexible barriers comprises one or more orifices to permit fluid flow between adjacent sub-cavities during normal operations and to limit the flow of the fluid between sub-cavities during the catastrophic event to prevent failure of the at least one of the plurality of flexible barriers.

9. The fail-safe container of claim 1, further comprising at least one longitudinal passage to transmit fluid to and from the plurality of sub-cavities.

10. The fail-safe container of claim 1, wherein the flexible barriers comprise a material that can stretch by at least about 200% without failing.

11. The fail-safe container of claim 1, wherein the flexible barriers comprise a material that can stretch by at least about 300% without failing.

12. The fail-safe container of claim 1, wherein the flexible barriers comprise a material that can stretch by at least about 400% without failing.

13. The fail-safe container of claim 1, wherein the plurality of sub-cavities surround at least one internal cavity for containing volatile materials.

14. A fail-safe container insert, comprising:
    a plurality of flexible barriers configured to be disposed within a cavity of a container, the plurality of flexible barriers configured to define a plurality of sub-cavities when disposed within the cavity;

wherein the plurality of flexible barriers are configured to deform during a catastrophic event to prevent failure of the container; and wherein the plurality of sub-cavities comprises a first interior plurality of subcavities and a second exterior plurality of sub-cavities positioned between the first interior plurality of sub-cavities and a container wall.

15. The fail-safe container insert of claim 14, wherein the catastrophic event comprises at least one of a collision, an overpressure event, a detonation, an impact or an ignition of a volatile substance.

16. The fail-safe container insert of claim 14, wherein the at least one of the plurality of sub-cavities is configured to accommodate a fluid.

17. The fail-safe container insert of claim 14, wherein one or more of the plurality of sub-cavities comprises a triangular prism.

18. The fail-safe container insert of claim 14, wherein one or more of the plurality of sub-cavities comprises at least one rhombohedron.

19. The fail-safe container insert of claim 14, wherein one or more of the plurality of sub cavities is configured to deform elastically during the catastrophic event.

20. The fail-safe container insert of claim 14, wherein one or more of the plurality of sub cavities is configured to deform plastically without failing during the catastrophic event.

21. The fail-safe container insert of claim 14, wherein at least one of the plurality of flexible barriers comprises one or more orifices to permit fluid flow between adjacent sub-cavities during normal operations and to limit the flow of the fluid between sub-cavities during the catastrophic event to prevent failure of the at least one of the plurality of flexible barriers.

22. The fail-safe container insert of claim 14, further comprising at least one longitudinal passage to transmit fluid to and from the plurality of sub-cavities.

23. The fail-safe container insert of claim 14, wherein the flexible barriers comprise a material that can stretch by at least about 200% without failing.

24. The fail-safe container insert of claim 14, wherein the flexible barriers comprise a material that can stretch by at least about 300% without failing.

25. The fail-safe container insert of claim 14, wherein the flexible barriers comprise a material that can stretch by at least about 400% without failing.

26. The fail-safe container insert of claim 14, wherein the plurality of sub-cavities surround at least one internal cavity for containing volatile materials.

* * * * *